Dec. 4, 1962
M. WATTER
3,066,822
COMPOSITE MISSILE STRUCTURE
Filed Oct. 19, 1959
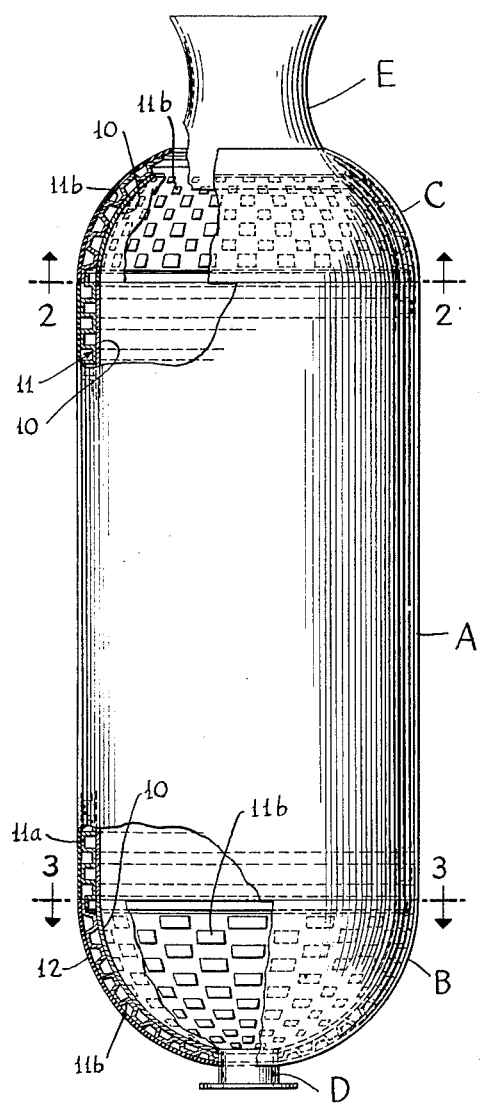
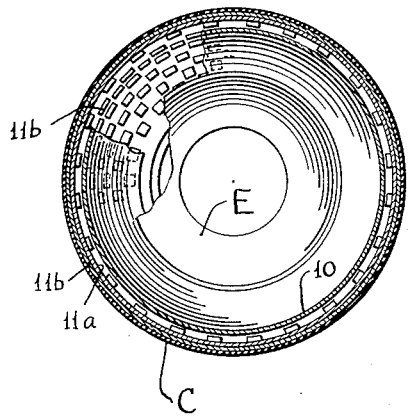
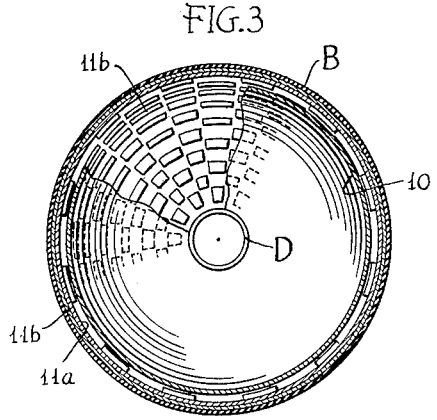
INVENTOR.
Michael Watter
BY
Wm. R. Thiesen
ATTORNEY

3,066,822
COMPOSITE MISSILE STRUCTURE
Michael Watter, Philadelphia, Pa., assignor to The Budd Company, Philadelphia, Pa., a corporation of Pennsylvania
Filed Oct. 19, 1959, Ser. No. 847,418
3 Claims. (Cl. 220—3)

This invention relates to a composite missile structure and has for an object the provision of improvements in this art.

One of the objects of the invention is to provide a missile structure which is formed of sandwich elements of outstanding strength and lightness.

Another object is to provide a cylindrical missile structure having intermediate portions formed of sandwich elements having corrugated cores with the corrugations circumferentially disposed and having ends or heads formed of sandwich elements having waffled cores, the arrangement thus providing the optimum utilization of the cores as related to the direction and magnitude of load stresses involved.

Another object is to provide a strong sandwich-formed missile structure with a non-metallic outside thermal shield which forms a part of the sandwich components.

The above and other objects and advantages of the invention will be apparent from the following description of an exemplary embodiment, reference being made to the accompanying drawings wherein:

FIG. 1 is a side elevation of a missile structure embodying the invention;

FIG. 2 is a transverse section taken on the line 2—2 of FIG. 1; and

FIG. 3 is a transverse section taken on the line 3—3 of FIG. 1.

The missile structure shown herein comprises a cylindrical section A, a lower head or end B and an upper head or end C. A flanged tubular member D is shown at the lower end and a nozzle member E at the upper end.

The entire structure except the members D and E is formed of light sheet metal, such as stainless steel, comprising an inner sheet 10 and a core 11 welded together as by autogenous resistance or inert gas eelctrode welding. The cores of the cylindrical portion A and the ends B and C are designed to give maximum strength in the direction of stress loads with the minimum weight. In the cylindrical portion the circumferential stress per unit cross section is twice the unit axial stress and here the corrugations of the core sheet 11a are arranged belt-fashion circumferentially. At the ends where the stresses are intermediate between circumferential and axial a waffle-type core 11b is used. Arc welding may be used to aid the welding of the heads to the cylindrical portion.

Exteriorly, for a thermal shield to protect the interior metal structure while the missile is heated highly while in travel, the entire structure is covered by a suitable nonmetallic envelope 12 of a material which is strong and has suitable heat resistance and heat insulating characteristics. Nylon has been found to be one suitable material. The nylon covering may be secured by an adhesive which has great strength and suitable-time-heat resistance. Alternately the corrugations can be filled with suitable foamed plastic having a thin external surface.

The waffle formation for the cores of the end portions is shown as being designed for the missile shown in which case a specially designed die would be used, but preformed waffle sheet of regular design may be used by cutting and welding along suitable lines.

The structure provided hereby has great strength for its weight and the strength is more nearly uniform throughout the whole structure than in structures heretofore provided. The heat shielding properties of the non-metallic outer skin insure the strength of the structure above that which would have been realized if an outer skin sheet of metal had been provided.

While one embodiment has been described for purposes of illustration it is to be understood that there may be various embodiments and modifications within the scope of the invention.

What is claimed is:

1. A composite missile structure having a cylindrical portion and a hemispherical end portion, comprising in combination; a thin wall smooth metal cylinder, a thin wall smooth metal hemisphere welded to said cylinder along a cylindrical end seam, a corrugated sheet metal core sheet surrounding said smooth cylinder, said corrugations forming continuous cylindrical wound flat raised and lowered bands around said smooth cylinder, said corrugated sheet being welded to said cylinder along said lowered bands, a first cylindrical end connection band on said corrugated sheet formed at the end of said corrugated sheet, a formed hemispherical waffled sheet metal core sheet provided with rectangular shaped depressions, said depressions forming discontinuous raised and lowered circular bands, a second cylindrical end connection band on said waffled core sheet abutting said first cylindrical end connection, and a weld connection joining said end connections providing a missile structure having compatible connections between core sheets and smooth sheets.

2. A composite missile structure as set forth in claim 1, wherein there is further provided a smooth nylon layer surrounding said core sheets forming said missile structure, formed of a heat-shielding non-metallic material.

3. A composite missile structure as set forth in claim 1, wherein there is further provided a smooth layer surrounding said core sheets forming said missile structure, said layer formed of heat-shielding non-metallic material secured by heat-resistant adhesive to said core sheets.

References Cited in the file of this patent

UNITED STATES PATENTS

| | | |
|---|---|---|
| 1,272,759 | Yttrup | July 16, 1918 |
| 1,927,255 | Brown | Sept. 19, 1933 |
| 2,391,997 | Noble | Jan. 1, 1946 |
| 2,507,778 | Frey | May 16, 1950 |
| 2,817,484 | Stenzel | Dec. 24, 1957 |
| 2,902,589 | Wirta | Sept. 1, 1959 |